(Model.)
R. J. PARRETT.
CARRIAGE TOP.
No. 255,328. Patented Mar. 21, 1882.
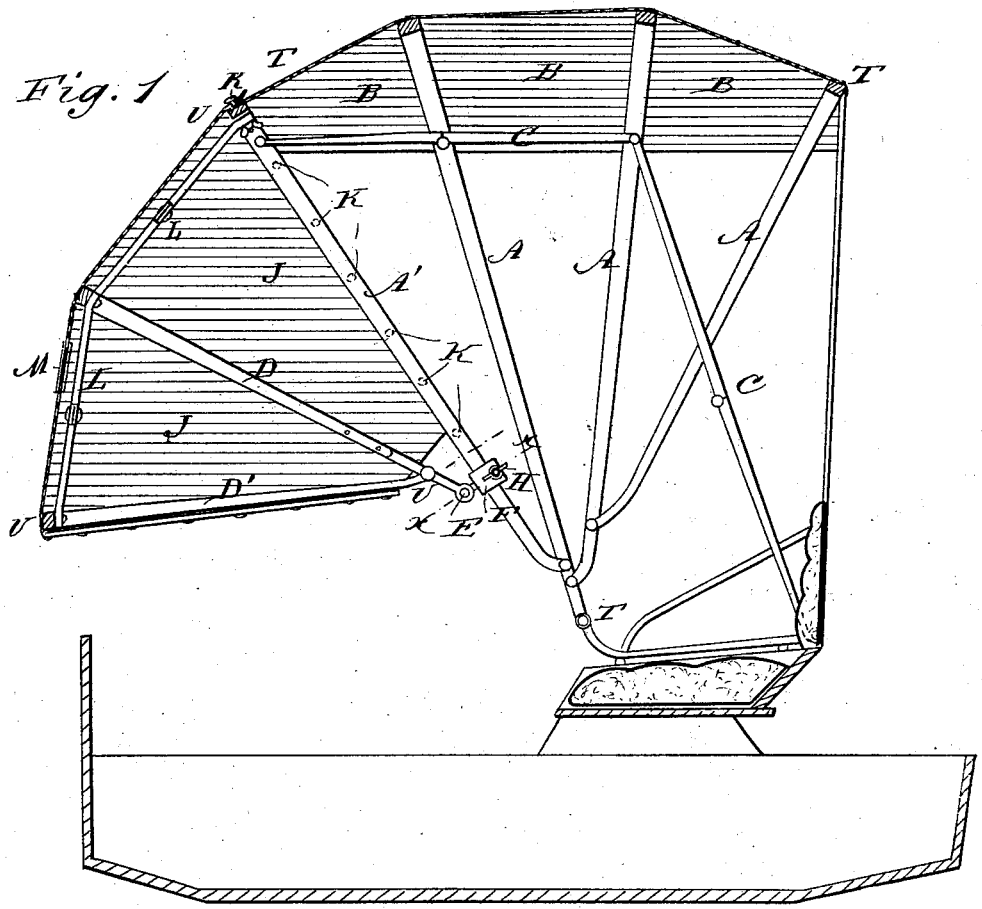
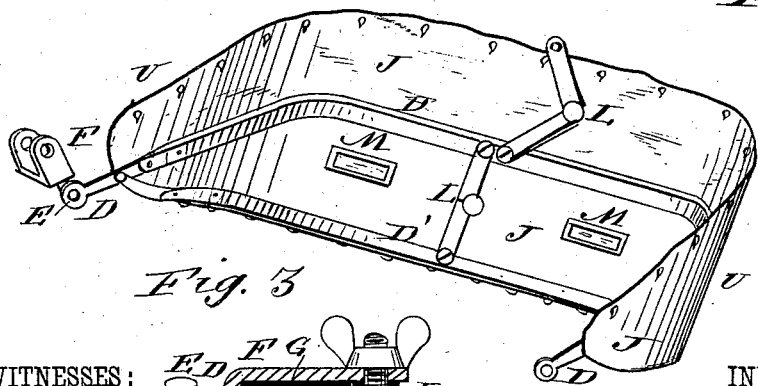
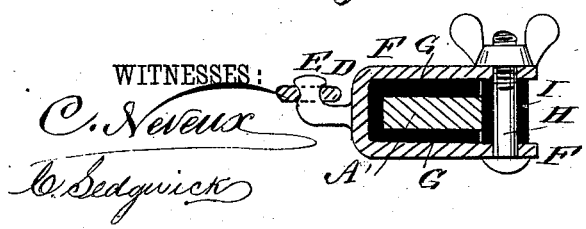
WITNESSES:
C. Neveux
C. Sedgwick
INVENTOR:
R. J. Parrett
BY Munn & Co
ATTORNEYS.
N. PETERS, Photo-Lithographer, Washington, D. C.

United States Patent Office.

RICHARD J. PARRETT, OF PORTLAND, INDIANA.

CARRIAGE-TOP.

SPECIFICATION forming part of Letters Patent No. 255,323, dated March 21, 1882.

Application filed January 17, 1882. (Model.)

*To all whom it may concern:*

Be it known that I, RICHARD J. PARRETT, of Portland, Jay county, Indiana, have invented a new and useful Improvement in Carriage-Tops, of which the following is a full, clear, and exact description.

Reference is to be had to the accompanying drawings, forming part of this specification, in which similar letters of reference indicate corresponding parts in all the figures.

Figure 1 is a sectional side elevation of my improvement, shown as applied to a buggy-top. Fig. 2 is a perspective view of the improvement, shown as detached and partly folded; and Fig. 3 is a sectional plan view of the pivot-clamp and bow, taken through the line $x\,x$, Fig. 1.

This invention relates to that class of vehicles that have folding tops of the ordinary construction; and the object of the invention is to provide such vehicles with an auxiliary top adapted to be attached, when desired, to the front part of the ordinary top, so as to extend the protecting area thereof, said auxiliary top being also adapted to be removed when not required for use.

A A' represent the bows, B the cover, and C the jointed brace-bars, of an ordinary carriage-top.

D D' are two bows, the ends of the forward one of which are hinged to the rear bow near its ends. The ends of the rear bow, D, are hinged to a hook, E, or other pivot attached to or formed upon a U-shaped clamp, F, the interior of which is lined with rubber, G, and is made of such a size and shape as to receive and fit upon the front bow, A', of the main top. The ends of the clamp F project at the rear side of the bow A', and are perforated to receive a hand-screw, H, or a bolt for drawing the said ends together to clamp the said bow A', and thus firmly connect the bows D D' with the bow A', the rubber lining G preventing the bow A' from being worn or injured by the said clamp. The screw or bolt H is passed through a rubber tube, I, to prevent the rear edge of the bow A' from being worn or injured by the said screw or bolt.

To the bows D is attached a cover, J, of rubber-cloth, leather, or other material, to correspond with the cover B of the carriage-top T. The rear edge of the cover J is secured detachably to knobs K, attached to the front bow, A'. The middle parts of the bows D D' are connected by a jointed brace-bar, L, and the middle part of the rear bow, D, is connected with the middle part of the forward bow, A', by a similar jointed brace-bar, L, so that the auxiliary top U can be folded together against the front bow, A', and extended, as may be required.

In openings in the middle part of the cover J, between the bows D D', are secured glass plates M, to enable the driver to see along the road in front of his team, so as to avoid teams or other obstructions that may be in the road. The space between the lower bow, D', and the dash-board of the carriage is sufficient to allow the driver to readily see his own team.

When not required for use, the supplementary top U can be folded together against the front bow, A', or it can be detached and laid beneath the carriage-seat, so as to be entirely out of the way.

Having thus described my invention, I claim as new and desire to secure by Letters Patent—

1. In a carriage, the combination, with the bow A', having knobs K, of an auxiliary top consisting of the bows D D', hinged together near the bottom and there clamped detachably to the bow A', the cover J, extending rearwardly and buttoning on said knobs, and the jointed bar L, connecting detachably with carriage-bow A', whereby the auxiliary top will hang over in front of the ordinary top, and can be readily attached to or detached from the carriage-top, as described.

2. The combination, with bows D A', of the rubber-lined clamp E F, the bolt H, and the tube I, as and for the purpose specified.

RICHARD JEFFERSON PARRETT.

Witnesses:
JOHN W. HEADINGTON,
ELI RINES.